(12) United States Patent
Yasuda

(10) Patent No.: US 6,941,445 B2
(45) Date of Patent: Sep. 6, 2005

(54) RESAMPLING ADDRESS GENERATOR

(75) Inventor: Nobuyuki Yasuda, Chiba (JP)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 10/244,042

(22) Filed: Sep. 13, 2002

(65) Prior Publication Data

US 2003/0079106 A1 Apr. 24, 2003

(30) Foreign Application Priority Data

Sep. 18, 2001 (JP) ........................................ 2001-283770

(51) Int. Cl.$^7$ .............................................. G06F 12/00
(52) U.S. Cl. ........................ 711/219; 711/220; 711/154; 708/313
(58) Field of Search ........................... 711/220; 708/313

(56) References Cited

U.S. PATENT DOCUMENTS

| 5,185,874 | A | * | 2/1993 | Trent et al. ................. | 711/219 |
| 5,617,088 | A | * | 4/1997 | Yasuda ........................ | 341/61 |
| 5,925,093 | A | * | 7/1999 | Yasuda ........................ | 708/313 |
| 5,996,044 | A | * | 11/1999 | Yasuda ........................ | 711/110 |
| 2002/0122518 | A1 | * | 9/2002 | Yasuda et al. .............. | 375/372 |

OTHER PUBLICATIONS

Noise analysis for optical frequency conversion using nearly degenerate four wave mixing in semiconductor optical amplifier Kikuchi, N.; Sasaki, S.; Lightwave Technology, Journal of , vol.: 11 , Issue: 5 , May–Jun. 1993 pp.: 819–828.*

VLSI architectures for real–time moving image resampling Naviner, L.A.deB.; Circuits and Systems, 1995., Proceedings of the 38th Midwest Symposium on , vol.: 2 , Aug. 13–16; pp.: 1260–1263 vol. 2.*

* cited by examiner

Primary Examiner—Brian R. Peugh
(74) Attorney, Agent, or Firm—Wolf, Greenfield & Sacks, P.C.

(57) ABSTRACT

A resampling address generator updates period data in a resampling period address register when the periods of input and output clocks are not stable, and generates a read address by supplying the output of a register to an accumulative adder. When the periods of the input and output clocks are stable, and a command is internally or externally received, the resampling address generator stops updating of the period data in the register, and generates the read address by supplying the output of the register to the accumulative adder. When the updating of the period data in the register is stopped, and a phase difference detector finds that the phase difference between the write address and the read address is outside a predetermined allowable range, the data in the register is updated based on correction data, and the read address is generated by supplying the output of the register to the accumulative adder.

7 Claims, 12 Drawing Sheets

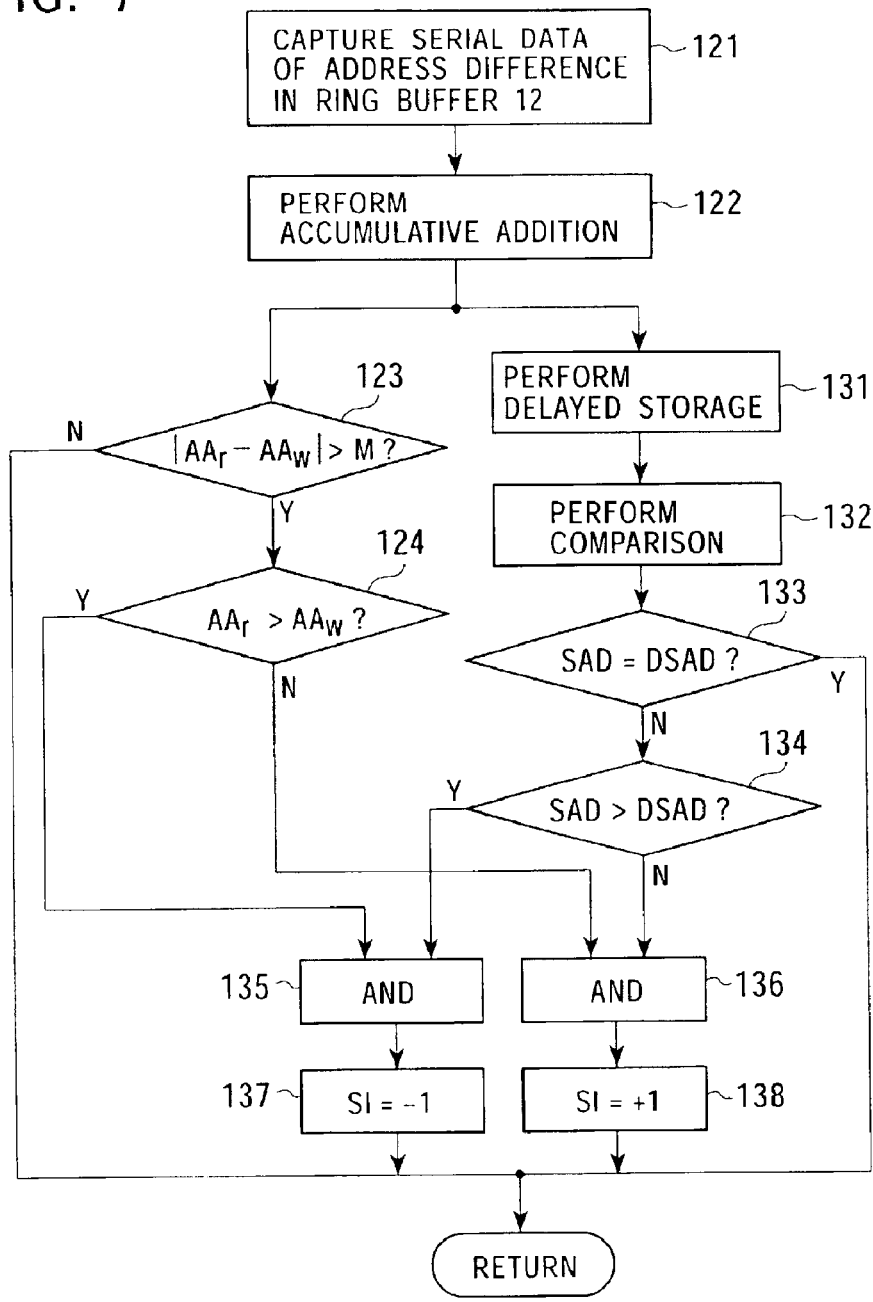

FIG. 7

$\begin{cases} 180° = \text{FULL ADDRESS}/2 \\ A_r - A_w = \text{RING-BUFFER-ADDRESS-DIFFERENCE DATA} \\ AA_w = \text{AVERAGE } A_w, \quad AA_r = \text{AVERAGE } A_r \\ |AA_r - AA_w| = \text{AVERAGE-ADDRESS-DIFFERENCE ABSOLUTE LEVEL} \\ SAD = AA_r - AA_w: \text{AVERAGE ADDRESS DIFFERENCE} \\ DSAD = \text{UNDELAYED-SAMPLE-AVERAGE-ADDRESS DIFFERENCE} \\ M = \text{REFERENCE LEVEL INDICATING WHETHER CORRECTION MAY} \\ \quad \text{BE PERFORMED} \end{cases}$

PRIOR ART

US 6,941,445 B2

RESAMPLING ADDRESS GENERATOR

BACKGROUND OF THE INVENTION

1. Field of the Invention

The present invention relates to a resampling address generator.

2. Description of the Related Art

The sampling frequency of digital audio data is set to 48 kHz or 32 kHz for digital audio tape (DAT) recording and satellite broadcasting, and is set to 44.1 kHz for compact disks (CDs) (including CDs recordable (CD-Rs) and CDs rewritable (CD-RWs)) and MiniDiscs (MDs). Accordingly, for example, when digital audio data obtained from a DAT or satellite broadcasting is recorded on a CD-R or MD, the sampling frequency must be converted to 44.1 kHz. Conversely, when digital audio data is obtained from a CD or MD, the sampling frequency must be converted to 48 kHz.

FIG. 10 shows the relationship in time domain between input data $D_i$ (digital audio data before the conversion of the sampling frequency) and output data $D_o$ (digital audio data after the conversion of the sampling frequency). In the following description, the sampling period of the input data $D_i$ is represented by $T_{si}$, the sampling period of the output data $D_o$ is represented by $T_{so}$, the sampling frequency of the input data $D_i$ is represented by $f_{si}$ where $f_{si}=1/T_{si}$, and the sampling frequency of the output data $D_o$ is represented by $f_{so}$ where $f_{so}=1/T_{so}$. FIG. 10 also shows a case in which $T_{si} > T_{so}$. In this case, $T_{si}=1/44.1$ kHz, and $T_{so}=1/48$ kHz.

Accordingly, for converting the sampling frequency, as FIG. 11 shows, the input data $D_i$ is written with a period $T_{si}$ into a ring buffer, and from the input data $D_i$, interpolation data is created at each point of the output data $D_o$. The interpolation data is extracted as the output data $D_o$.

In this Specification, the difference (shown in FIG. 11) between a read address and a write address in the ring buffer is called a "phase difference".

FIG. 12 shows an example of sampling frequency conversion, where a sampling frequency of 44.1 kHz is converted to 48 kHz. In part A of FIG. 12, the crosses indicate samples of the input data $D_i$ at 1/44.1-kHz intervals, and the circle indicates a typical sample of the output data $D_o$. The point (resampling point) of the output data $D_o$ is determined by an output clock signal.

As part B of FIG. 12 shows, the input data $D_i$ is oversampled to form data $D_b$ having an eight-fold sampling frequency. The triangles indicate interpolation data formed by the oversampling. The oversampling is smoothly performed by using many samples of the input data $D_i$.

As part C of FIG. 12 shows, the data $D_b$ is oversampled to form data $D_c$ having a 64-fold sampling frequency. The squares indicate interpolation data formed by the oversampling. The oversampling is also smoothly performed by using many samples of the input data $D_b$. At this time, the sampling frequency of the data $D_c$ is 512 times (=8×64 times) that of the original input data $D_i$.

As parts C and D of FIG. 12 show, in the data $D_c$, from data $D_1$ and data $D_2$ at points $t_1$ and $t_2$ adjacent to a point $t_n$ of the output data $D_o$, output data $D_o$ is formed by linear interpolation. As is clear from the description of parts C and D of FIG. 12, it is not necessary to form all the samples of the data $D_c$. Only the data $D_1$ and $D_2$ may be formed as the data $D_c$.

In addition, when the data $D_o$ is formed by linear interpolation, no problem occurs if the resampling point $t_n$ (the point of the data $D_o$) is within the required time precision. For example, the time interval between the data $D_1$ and the data $D_2$ is divided into 4096 lengths, and among the boundary (time) points between the lengths, the data $D_o$ may be obtained at the point closest to the resampling point $t_n$. In other words, assuming that the sampling frequency of the input data $D_i$ is 44.1 kHz, when the length of one period of the data $D_c$ ($D_1$, $D_2$) having a sampling frequency which is 512 times 44.1 kHz is divided into 4096 lengths, the divided length is approximately 11 picoseconds (1/44.1 kHz×512×4096). Thus, the error at the resampling point $t_n$ is 11 picoseconds or less. This precision is sufficient.

As described above, in the conversion in FIG. 12, the data $D_o$ and the resampling point can be controlled to have sufficient precision even if the sampling frequency is converted.

The points $t_1$ and $t_2$ are determined by an input-side clock, while the point $t_n$ at which the output data $D_o$ is obtained is determined by an output-side clock and is not related to the input-side clock. Thus, there is no limitation on the relationship between the input sampling frequency (the sampling frequency of the input data $D_i$) and the output sampling frequency (the sampling frequency of the output data $D_o$). Accordingly, the conversion circuit for the sampling frequency can be formed as an asynchronous type.

FIG. 13 shows an example of a conversion circuit for realizing the above-described sampling frequency conversion. In this conversion circuit, input data $D_i$ is supplied to an oversampling filter 11 and it generates data $D_b$ having a sampling frequency eight times that of the input data $D_i$. The data $D_b$ is sequentially written into a buffer memory 12 while being synchronized with an input-side clock $C_i$, and is read while being synchronized with an output-side clock $C_o$. In this case, the buffer memory 12 has a ring buffer structure and is used to temporarily store the data $D_b$ and to absorb the difference in sampling frequency between the input data $D_i$ and the output data $D_o$.

The data $D_b$ read from the buffer memory 12 is supplied to an oversampling filter 13 having a finite impulse response (FIR) filter structure and it generates data $D_c$ (data $D_1$, data $D_2$). The data $D_c$ is supplied to an interpolation circuit 14, and the data $D_1$ and the data $D_2$ are processed by linear interpolation to generate output data $D_o$, which is extracted.

In this case, as shown in, for example, in part D of FIG. 12, the output data $D_o$ obtained by linear interpolation is represented by $$D_o = a_1/(a_1+a_2) \cdot D_2 + a_2/(a_1+a_2) \cdot D_1$$

where $a_1$ represents the time length from the point $t_1$ to the point $t_n$, and $a_2$ represents the time length from the point $t_n$ to the point $t_2$. Each of the values $a_1$ and $a_2$ can be obtained by counting the input clock $C_i$ in the length that is, for example, 65536 times the sampling period $T_{so}$ of the output data $D_o$.

Accordingly, the conversion circuit in FIG. 13 includes an address forming circuit 20. In the address forming circuit 20, based on the input clock $C_i$, a write-address signal $A_w$ that is synchronized therewith is formed and supplied to the buffer memory 12. A read-address signal $A_r$ synchronized with the output clock $C_o$ is formed based on the input clock $C_i$ and the output clock $C_o$ by the address forming circuit 20, and is supplied to the buffer memory 12, the oversampling filter 13, and the interpolation circuit 14.

The following two methods 1 and 2 are known as a method for, by the address forming circuit 20, forming the read-address signal $A_r$, that is, the address of the resampling point. In method 1, the period of the output clock $C_o$ is measured in units of each period of the input clock $C_i$, and the measured value is used to obtain the address of the resampling point. In method 2, by feeding back the difference in period between the input clock $C_i$ and the output clock $C_o$ the address of the input clock $C_i$ and the output clock $C_o$ can be obtained. Method 2 is called the "phase-locked loop (PLL) method".

In the case of method 1, assuming that the sampling frequency $f_{si}$ of the input data $D_i$=44.1 kHz, and the sampling frequency $f_{so}$ of the output data $D_o$=48 kHz, $$f_{si} : f_{so} = 44.1 \text{ kHz:48 kHz}$$
$$= 235.2 : 256$$

Thus, in the measurement of the period $T_{so}$ by directly using the input clock $C_i$ and the output clock $C_o$, the period $T_{so}$ of the output clock $C_o$ cannot correctly be measured.

Accordingly, actually, as FIG. 14 shows, by counting the input clock $C_i$ during a long time, for example, approximately 1.4 seconds ($=T_{so}$×65536), the length of 65536 periods of the output clock $C_o$ is measured. From the measured value, the period of the address of the resampling point is found and accumulatively added, whereby the address of the resampling point is formed.

In the case of method 2, as FIG. 15 shows, by integrating the difference in address between the write address and the read address, the period of the address of the resampling point is found and accumulatively added. Also, by feeding back the output of an accumulative adder, the address of the resampling point is formed.

Nevertheless, method 1 has a limitation on an increase in precision when the measuring time is finite. Also, an increased measuring time for increasing the precision causes a discrepancy in that instantaneous precision decreases because the difference between the measured value and the actual time increases.

Method 2 employs feedback control in proportional to the difference between the write address and the read address. Thus, the essential properties of this type of control system are regarded as problems. Specifically, the problems are as follows:
(i) The control holds based on an error;
(ii) The time phase delay of the control system generates transient response characteristics; and
(iii) Remaining jitter or an acoustically unnatural transient change occurs to affect sound quality, even if the transmission system is improved by using a digital filter, etc.

SUMMARY OF THE INVENTION

It is an object of the present invention to solve the above-described problems.

To this end, according to an aspect of the present invention, a resampling address generator for generating a write address and a read address in a buffer memory for a sampling frequency converter is provided. The resampling address generator includes a resampling period address generator for generating period data representing the period of the read address in accordance with a sampling frequency ratio between an input clock and an output clock, a resampling period address register for retaining the period data generated by the resampling period address generator, a selector for selectively extracting the period data generated by the resampling period address generator and the period data retained by the resampling period address register, an accumulative adder for generating the read address by accumulatively adding the selected period data, and a frequency change detector for determining whether or not the period of the input clock and the output clock are stable. When the frequency change detector determines that the periods of the input clock and the output clock are stable, the selector is controlled to extract the period data retained by the resampling period address register.

Preferably, the resampling address generator further includes a phase-difference detector for detecting, in each predetermined period, the phase difference between the write address and the read address, and a correcting unit which, when the detected phase difference is outside an allowable range, corrects the period data retained by the resampling period address register so that the detected phase difference is within the allowable range.

The correcting unit may extract a change in the detected phase difference for the predetermined period, and may perform, on the period data retained by the resampling period address register, correction based on the extracted change and the detected phase difference.

According to another aspect of the present invention, a resampling address generator for generating a write address and a read address in a buffer memory for a sampling frequency converter is provided. The resampling address generator includes a resampling period address generator for generating period data representing the period of the read address in accordance with a sampling frequency ratio between an input clock and an output clock, a correcting unit for generating corrected period data by correcting the period data, a selector for selectively extracting the period data and the corrected period data, a resampling period address register for temporally retaining an output from the selector, an accumulative adder for generating the read address by accumulatively adding the output of the resampling period address register, a period detector for determining whether or not the periods of the input clock and the output clock are stable, and a phase difference detector for detecting a phase difference between the write address and the read address. When the output of the period detector does not indicate that the periods of the input clock and the output clock are stable, the value of the data retained by the resampling period address register is updated by loading the period data into the resampling period address register through the selector, and the read address is generated by supplying the output of the resampling period address register to the accumulative adder. When the output of the period detector indicates that the periods of the input clock and the output clock are stable, and a command is internally or externally received, updating of the data retained by the resampling period address register is stopped, and the read address is generated by supplying the output of the resampling period address register to the accumulative adder. When the updating of the data retained by the resampling period address register is stopped, and the output of the phase difference detector indicates that the phase difference between the write address and the read address is outside a predetermined allowable range, the value of the data retained by the resampling period address register is updated by loading the corrected period data through the selector, and the read address is generated by supplying the output of the resampling period address register to the accumulative adder.

Preferably, the resampling address generator includes a counter for determining the period of the output clock by using the input clock as each unit, a circuit for outputting the moving average of outputs from the counter, and a second selector for selectively extracting one output from the counter and the output moving average. When the output of the period detector does not indicate that the periods of the input clock and the output clock are stable, the output from the counter is output as the period data through the second selector. When the output of the period detector indicates that the periods of the input clock and the output clock are stable, the output moving average is output as the period data through the second selector.

According to another aspect of the present invention, a resampling address generator for generating a write address and a read address in a buffer memory for a sampling frequency converter is provided. The resampling address generator includes an add-subtract unit for correcting period data representing the period of the read address by performing addition or subtraction of correction data, a resampling period address register for feeding back the corrected period data to the add-subtract unit after temporarily retaining the period data, an accumulative adder for generating the read address by performing accumulative addition of the retained period data, a phase difference detector for detecting a phase difference between the write address and the read address, and a correcting unit for generating the correction data by using the output of the phase difference detector.

Preferably, the correcting unit extracts a change in the detected phase difference for the predetermined period, and performs, on the period data retained by the resampling period address register, correction based on the extracted change and the detected phase difference.

According to the present invention, when the phase difference between a write address and a read address is within an allowable range and is stable, no change occurs in the period of a resampling address, and approximately sampling is realized. When the phase difference is outside the allowable range, the phase difference is corrected. Thus, a high precision read address can always be obtained. In addition, the present invention can be applied to asynchronous sampling frequency converter.

BRIEF DESCRIPTION OF THE DRAWINGS

FIG. 7 is a flowchart showing the operation of the resampling address generator shown in FIG. 6;

DESCRIPTION OF THE PREFERRED EMBODIMENTS

In the present invention, while the frequency ratio $f_r$ ($=f_{so}/f_{si}$) of the sampling frequency $f_{si}$ of the input data $D_i$ to the sampling frequency $f_{so}$ of the output data $D_o$ is stable, one of methods 1 and 2 is used to obtain the period of the address of the resampling point. This operation mode is hereinafter referred to as the "normal mode". After a predetermined operation mode (hereinafter referred to as an "advanced mode") is set, the period is retained without being updated, and a change in the period of the address of the resampling point, which is caused by an error not more than the resolution of method 1 or method 2, is eliminated.

However, in the case of using only the above construction, due to an error from the actual period of the address, the difference in phase between the write address and the read address in a data buffer is gradually shifted from an allowable range.

Accordingly, in the present invention, by information of the difference in phase between the past and present addresses by periodically extracting the write address and the read address, a change in the phase difference thereafter is predicted, and the period of the address of the resampling point in accordance with the predicted change is corrected, so that the phase difference between the write address and the read address can be within the allowable range.

Figure 1:
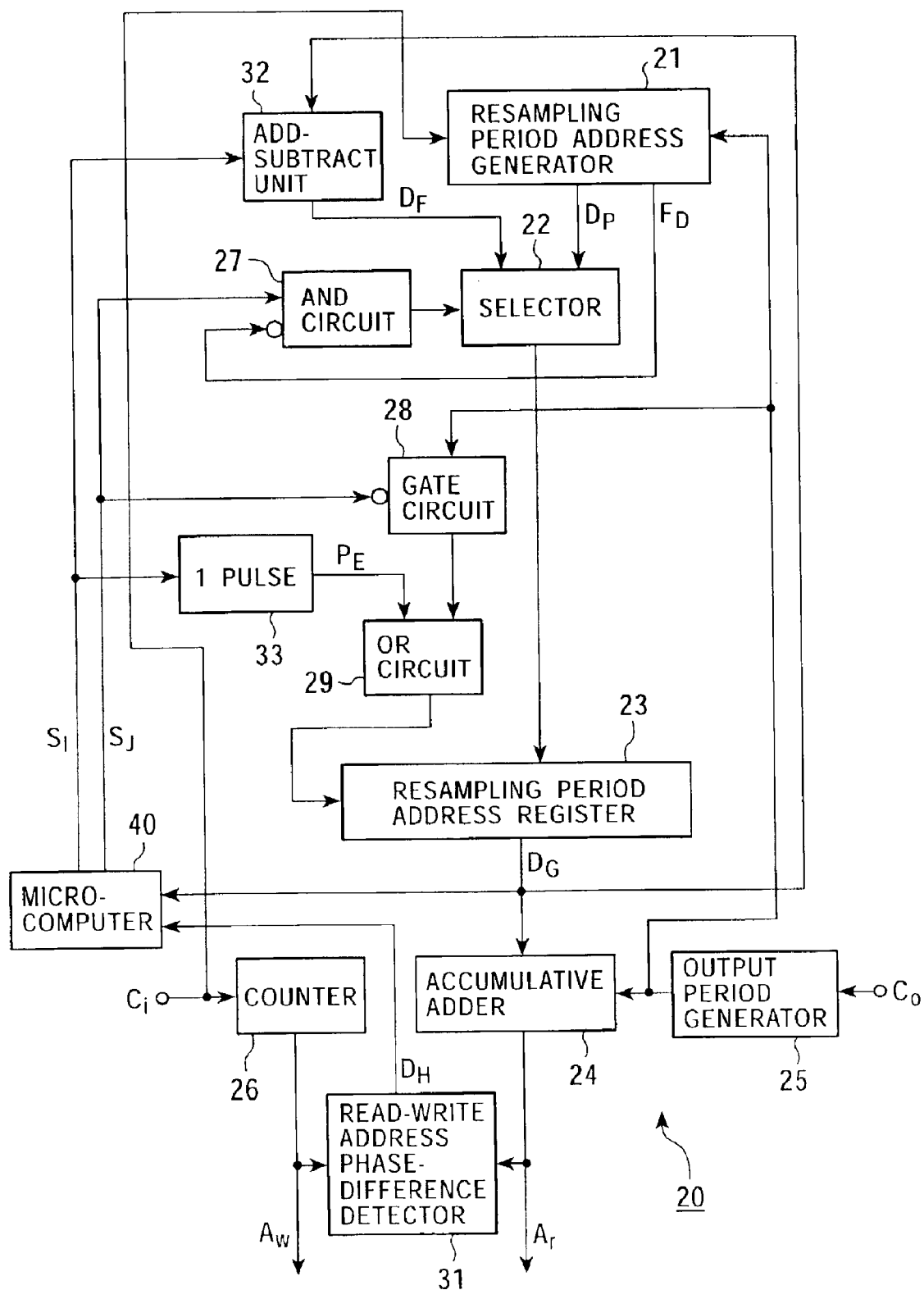
FIG. 1 is a block diagram showing a resampling address generator according to an embodiment of the present invention.

FIG. 1 shows an example of a resampling address generator 20 of the present invention. The resampling address generator 20 includes a resampling period address generator 21. The resampling period address generator 21 uses the above-described method 1 to form period data $D_P$ of the address of the resampling point, and a high speed change flag $F_D$ indicating whether or not the period $T_{si}$ of the input clock $C_i$ and the period $T_{so}$ of the output clock $C_o$ are stable. The high speed change flag $F_D$ is in "L" (low level) when both the periods $T_{si}$ and $T_{so}$ are stable, and is in "H" (high level) when either of both periods is not stable.

The period data $D_P$ is temporarily loaded from the resampling period address generator 21 to a resampling period address register 23 through a selector 22 (controlled as described later). The loaded period data $D_P$ is extracted as period data $D_G$ from the resampling period address register 23. The extracted period data $D_G$ is supplied to an accumulative adder 24.

An output clock $C_o$ is supplied to an output period generator 25, and in the output period generator 25, each pulse having a period that is 65536 times that of the clock $C_o$ is generated and is supplied to the accumulative adder 24. The accumulative adder 24 forms a read-address signal $A_r$. Also, at this time, the input clock $C_i$ is supplied to a counter 26, and it forms a write-address signal $A_w$.

In this case, a microcomputer 40 generates an advanced control command signal $S_J$. The advanced control command signal $S_J$ is in "L" in the normal mode, and is in "H" in the advanced mode. Accordingly, since $S_J$="L" in the normal mode, the output of an AND circuit 27 is in "L" and is supplied as a control signal to the selector 22, whereby the period data $D_P$ is supplied from the resampling period address generator 21 to the resampling period address register 23 through the selector 22.

The advanced control command signal $S_J$ is also supplied as a control signal to a gate circuit 28. This controls the gate circuit 28 to be in a state that allows an input signal to pass through it when $S_J$="L", so that the output of the output period generator 25 is supplied as load pulses to the resampling period address register 23 through the gate circuit 28 and an OR circuit 29. Accordingly, the output of the selector 22, that is, in this case, the period data $D_P$ from the resampling period address generator 21 is loaded into the resampling period address register 23, as described above. In this manner, the read-address signal $A_r$ in the normal mode is formed.

However, when the frequency ratio $f_r$ is stable regarding the clocks $C_i$ and $C_o$ (at this time, the high speed change flag $F_D$ is in "L"), and the advanced mode is set, in other words, when the microcomputer 40 sets the advanced control command signal $S_J$ to be in "H", load pulses supplied to the resampling period address register 23 through the gate circuit 28 are stopped by the gate circuit 28. Thus, the period data DG from the resampling period address register 23 is not updated thereafter. Accordingly, after that, in the period of the address of the resampling point, a change does not occur which is caused by the resampling period address generator 21 and the resolution of its output data $D_P$.

When this state continues, the phase difference between he write address $A_w$ and the read address $A_r$ gradually becomes shifted from the allowable range. Accordingly, to prevent the shifting, the following construction is further employed.

Specifically, a read-write address phase-difference detector 31 detects a phase difference between the write address and the read address from the address signals $A_w$ and $A_r$, and the microcomputer 40 generates a resampling-point-period-correcting command signal SI by reading phase-difference data $D_H$ corresponding to the phase difference in a predetermined period. In this case, the resampling-point-period-correcting command signal SI has the value "−1" when the phase difference represented by the phase-difference data $D_H$ is shifted from a predetermined allowable range to an increasing direction, and has the value "+1" when the phase difference is shifted from the predetermined allowable range to a decreasing direction.

The resampling-point-period-correcting command signal SI is supplied to an add-subtract unit 32, and the period data $D_G$ is supplied from the resampling period address register 23 to the add-subtract unit 32. Accordingly, when the phase difference represented by the phase-difference data $D_H$ is shifted in the increasing direction, the add-subtract unit 32 outputs period data $D_F$ that is corrected so that its value is less than the period data $D_G$ by "1". When the phase difference represented by the phase-difference data $D_H$ is shifted in the decreasing direction, the add-subtract unit 32 outputs period data $D_F$ that is corrected so that its value is greater than the period data $D_G$ by "1". The generated period data $D_F$ is supplied to the selector 22.

At this time, the advance mode is activated, and the advanced control command signal $S_J$="H" and the high speed change flag $F_D$="L", the output of the AND circuit 27 causes the selector 22 to be in a state for outputting the period data $D_F$ from the add-subtract unit 32. The resampling-point-period-correcting command signal SI is supplied to a pulse circuit 33 (indicated by "1 PULSE"), and when the value of the resampling-point-period-correcting command signal SI changes from the retained value to "+1" or "−1", a pulse $P_E$ representing the change is generated and is supplied as a load pulse to the resampling period address register 23.

Accordingly, when the phase difference between the write address $A_w$ and the read address $A_r$ is shifted from the allowable range, the period data $D_G$ output from the resampling period address register 23 increases or decreases by "1" for each pulse $P_E$ and is fed back to the add-subtract unit 32. Thus, the period data $D_G$ is controlled to converge to a correct value, so that the phase difference between write address $A_w$ and the read address $A_r$ converges to zero.

As described above, in the advanced mode, the read address $A_r$ is formed with high precision, and the phase difference between the write address $A_w$ and the read address $A_r$ is within the predetermined allowable range.

In the resampling address generator 20, when the phase difference between the write address $A_w$ and the read address $A_r$ is within the allowable range and is stable, no change occurs in the period of the resampling address, and appropriate resampling is realized. When the phase difference is outside the allowable range, the read address $A_r$ can always be obtained with high precision because the phase difference is corrected. Also, this can be applied to a nonsynchronizing sampling frequency conversion circuit.

Figure 2:
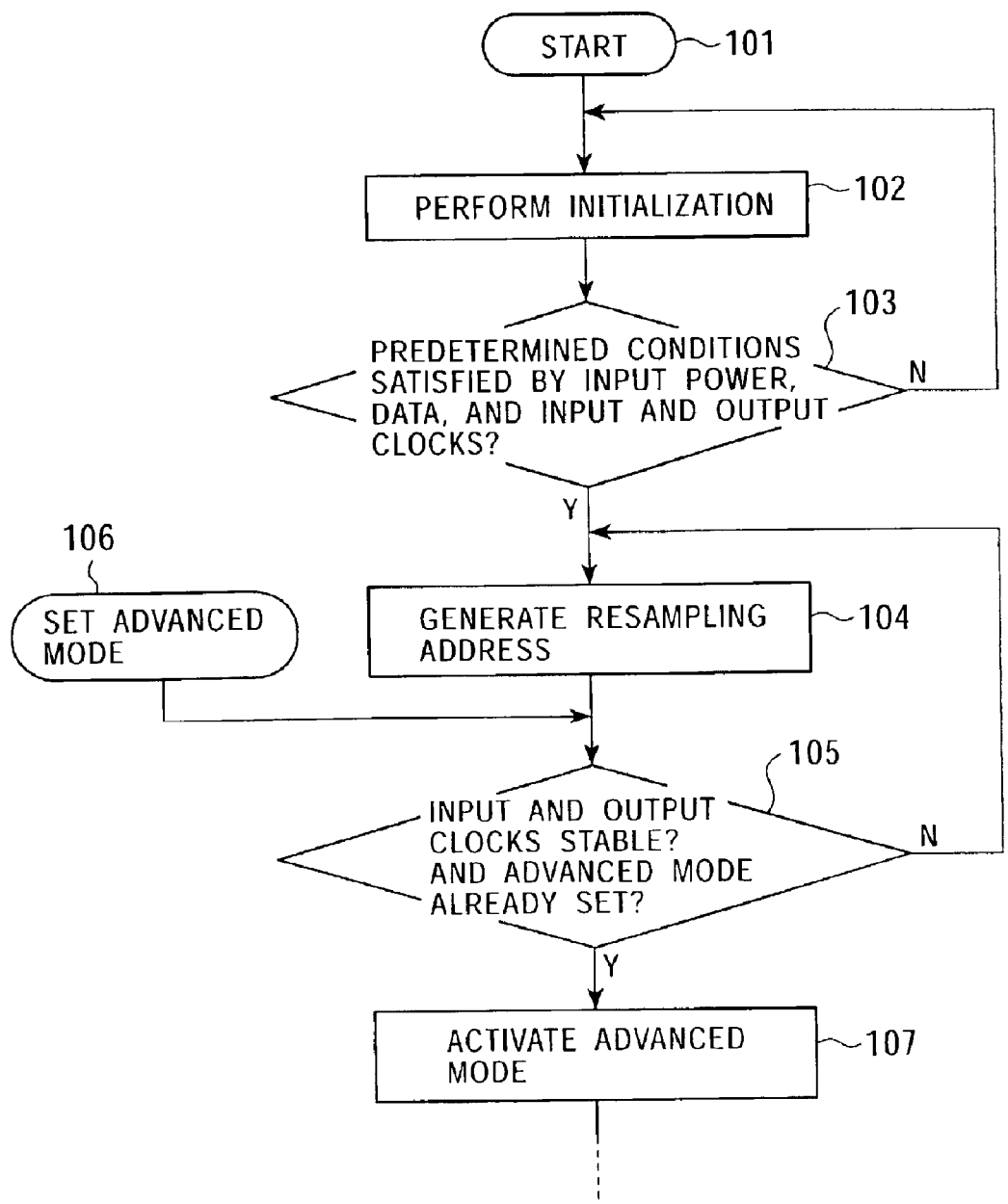
FIG. 2 is a flowchart showing the operation of the resampling address generator shown in FIG. 1.

FIG. 2 shows a flowchart of a process performed until the resampling address generator 20 enters the advanced mode. Specifically, when power, the input data $D_i$, and the input clock $C_i$ and the output clock $C_o$ are supplied to the resampling address generator 20, it starts to operate (step S101). Each circuit is initialized (step S102). After that, the resampling address generator 20 is on standby until the power, the input data $D_i$, and the input clock $C_i$ and the output clock $C_o$ satisfy predetermined conditions (step S103).

When the conditions are satisfied, the resampling address generator 20 enters a state in which method 1 is used to form a resampling address, that is, the normal mode (step S104), and in the normal mode, it is determined whether or not the clocks $C_i$ and $C_o$ are stable and it is determined whether or not the advanced mode is set (step S105). In this manner, ordinarily, the address of the resampling point is formed in the normal mode.

However, when the advanced mode is set (step S106), the resampling address generator 20 enters the advanced mode if the clocks $C_i$ and $C_o$ are stable (step S107).

Figure 3:
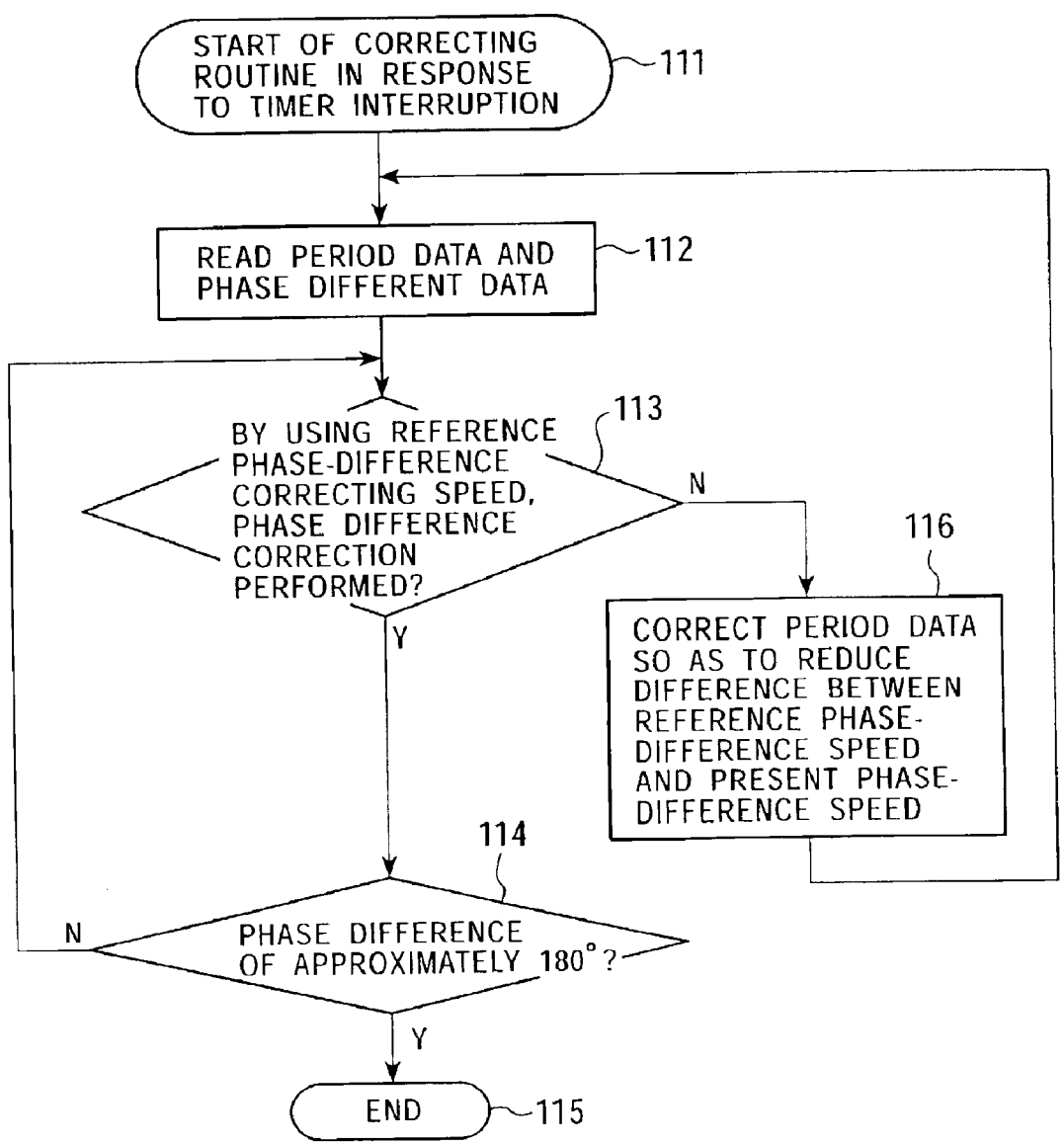
FIG. 3 is a flowchart showing the operation of the resampling address generator shown in FIG. 1.

FIG. 3 shows a flowchart of a process (routine) for correcting the phase difference between the write address $A_w$ and the read address $A_r$ in the advanced mode. The correcting routine is periodically executed in response to timer interruption. When an interruption occurs, the correcting routine starts (step S111). The period data $D_G$ in the resampling period address register 23 and the phase-difference data $D_H$ detected by the read-write address phase-difference detector 31 are read (step S112), and the phase difference between the write address $A_w$ and the read address $A_r$ is checked for magnitude (steps S113 and S114).

When the phase difference is within a set range (range in which the phase difference can be corrected by the correcting routine), the correcting routine is terminated without executing any step (step S115). When the phase difference is outside the set range, the resampling-point-period-correcting command signal SI is output so that the difference between an estimated standard phase-difference characteristic (as shown in FIG. 4) ("REFERENCE PHASE-DIFFERENCE CORRECTING SPEED" in FIG. 3) and the phase-difference speed at the time can be reduced, and the period data $D_F$ is corrected (step S116).

Figure 4:
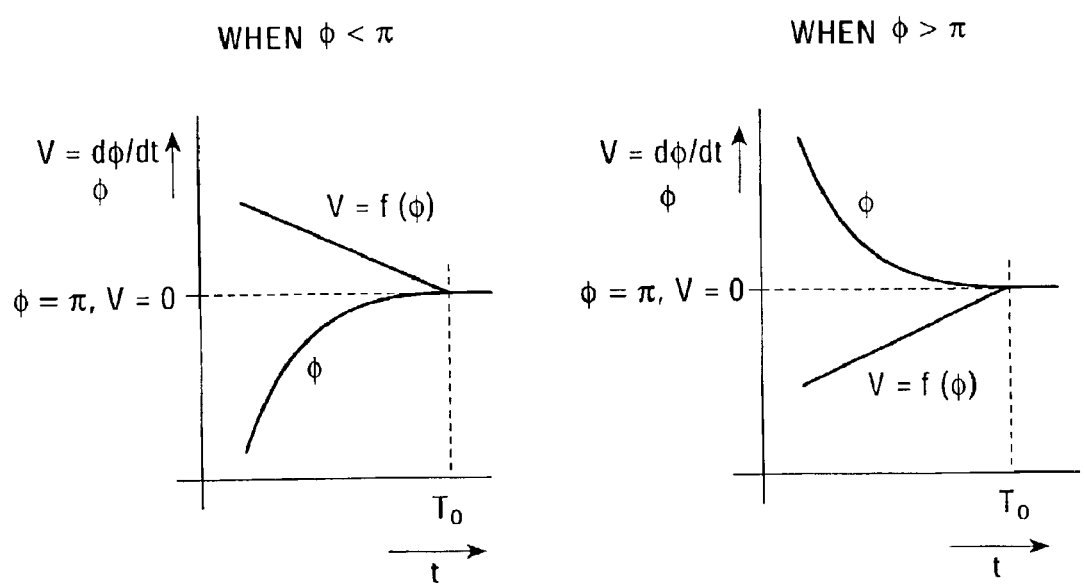
FIG. 4 consists of characteristics graphs showing the operation of the resampling address generator shown in FIG. 1.

In FIGS. 3 and 4, the appropriate value for the phase difference between the write address $A_w$ and the read address $A_r$ is described as 180 degrees ($=\pi$). By way of example, in FIG. 4, standard conversion characteristics are as follows:

$\phi - \pi = -K \cdot (T_0 - t)^2$   $\phi < \pi$   K: positive integer $\phi - \pi + K \cdot (T_0 - t)^2$   $\phi > \pi$   K: positive integer $V = +2K \cdot (T_0 - t)$   $\phi < \pi$   K: positive integer $V = +2K \cdot (T_0 - t)$   $\phi > \pi$   K: positive integer where $\phi$ represents the phase difference between the write address $A_w$ and the read address $A_r$, V represents a change factor against time, and $T_0$ represents the target conversion time.

By periodically executing the correcting routine, an address phase difference can stably be controlled, with almost no overshoot generated.

Figure 5:
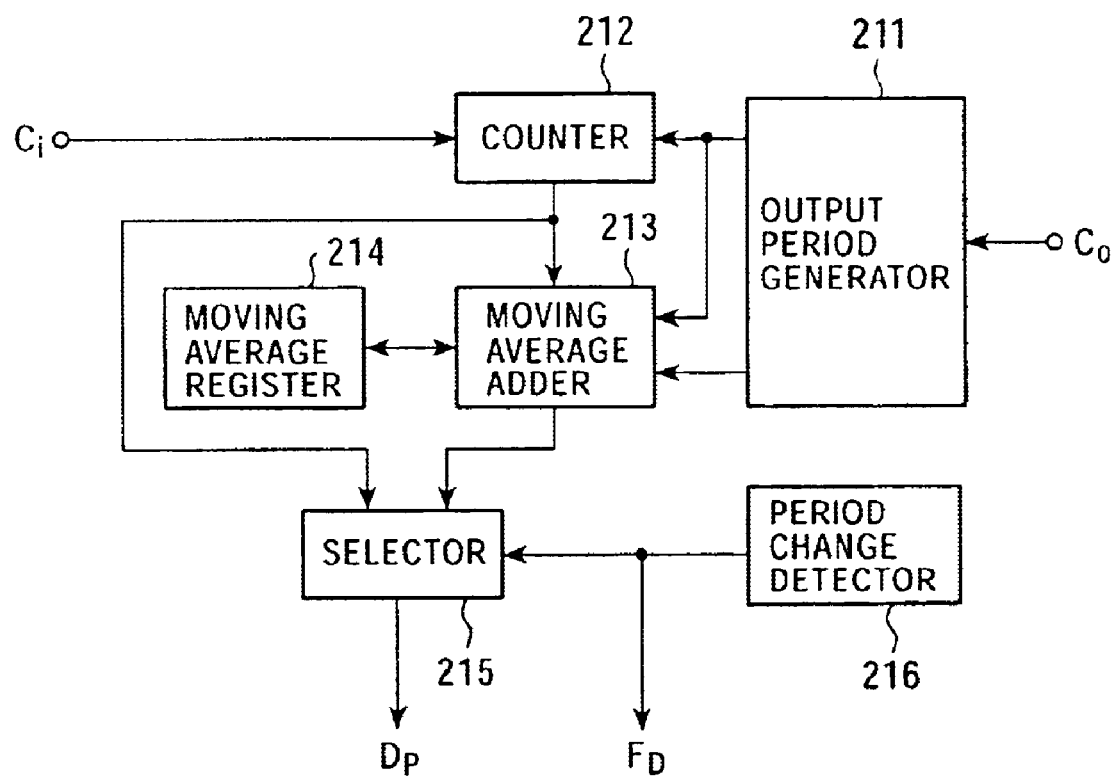
FIG. 5 is a block diagram showing part of the resampling address generator shown in FIG. 1.

FIG. 5 shows an example of the resampling period address generator 21 which is designed to cope with a change. Specifically, an output period generator 211 generates a signal representing a period that is 65536 times ($=65536 \times T_{so}$) that of the output clock $C_o$, and a counter 212 determines the length of 65536 periods of the output clock $C_o$ in units of each period of the input clock $C_i$. An output from the counter 212 is supplied as an input to a selector 215. Another output from the counter 212 is supplied and processed by a moving average adder 213 and a moving average register 214, and the processed output is supplied as another input to the selector 215.

A period change detector 216 detects a change in the periods of the clocks $C_i$ and $C_o$. The detection output is supplied as a control signal to the selector 215. When the period of at least one of the clocks $C_i$ and $C_o$ is instable in cases such as the beginning of operation, the output of the counter 212 is extracted as period data $D_p$. When the periods of the clocks $C_i$ and $C_o$ are stable in the normal operation, a moving average output from the moving average adder 213 is extracted as period data $D_p$. At this time, a detection output from the period change detector 216 is extracted as high speed change flag $F_D$.

Accordingly, when the period of at least one of the clocks $C_i$ and $C_o$ is instable in cases such as the beginning of operation, values measured in a short time are used to obtain readiness. When the periods of the clocks $C_i$ and $C_o$ are stable in the normal operation, the moving average of values measured in a long time is used to increase the precision.

In this embodiment, the period change detector 216 detects a change in the periods of the clocks $C_i$ and $C_o$ and determines whether or not the periods are stable. However, this embodiment is not limited thereto, but the determination may be performed based on a change in time in the address phase difference detected by the read-write address phase-difference detector 31. Also, the determination may be performed based on both detection outputs supplied to the selector 215 in FIG. 5.

Figure 6:
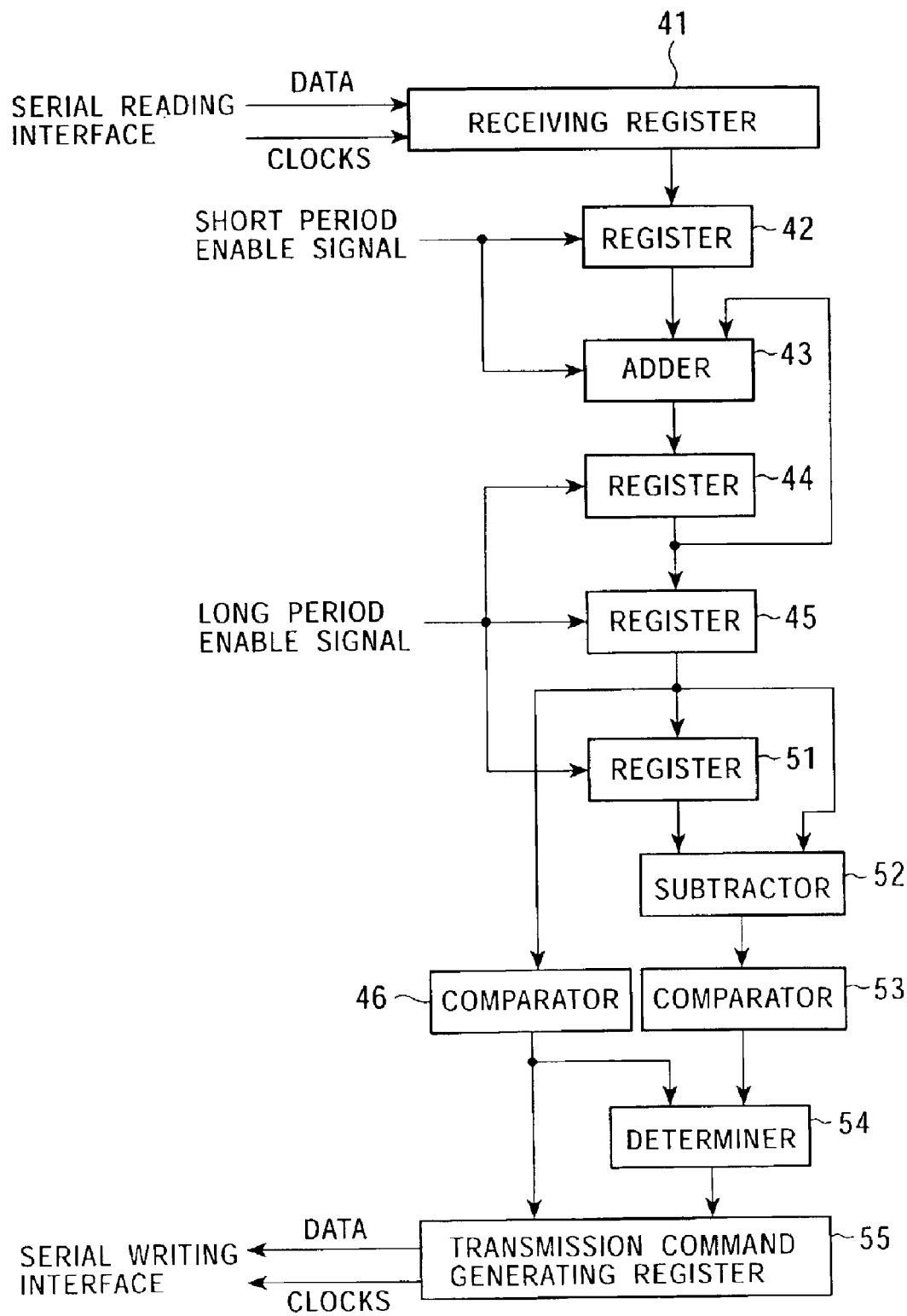
FIG. 6 is a block diagram showing the main part of the resampling address generator shown in FIG. 1.

FIG. 6 shows a case in which the functions and operation of the microcomputer 40 are realized by a hardware logic circuit. FIG. 7 is a flowchart showing details of a correcting process of the microcomputer 40.

Figure 13:
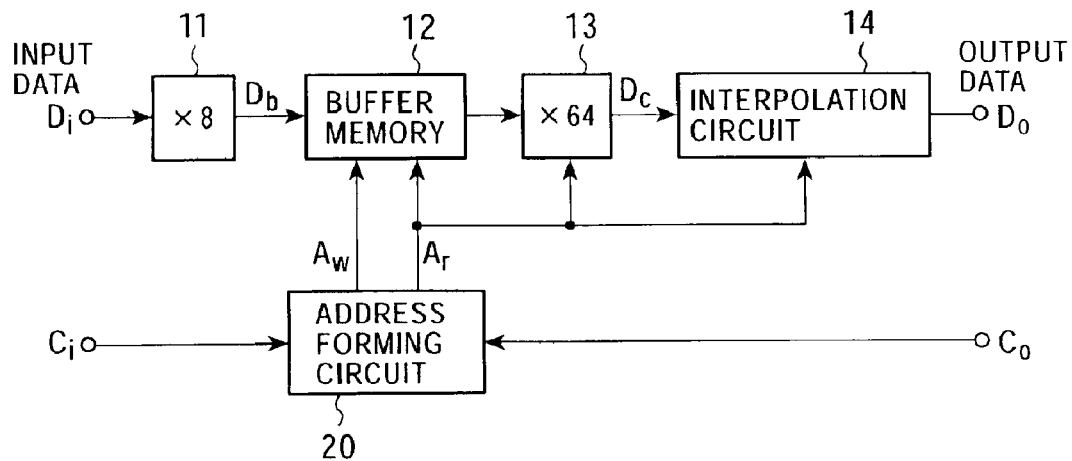
FIG. 13 is a block diagram showing an example of a resampling frequency converter.
Figure 14:
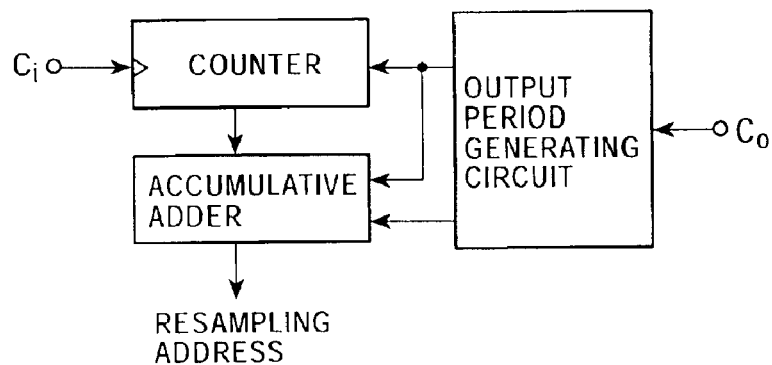
FIG. 14 is a block diagram showing an example of a sampling address forming circuit.
Figure 15:
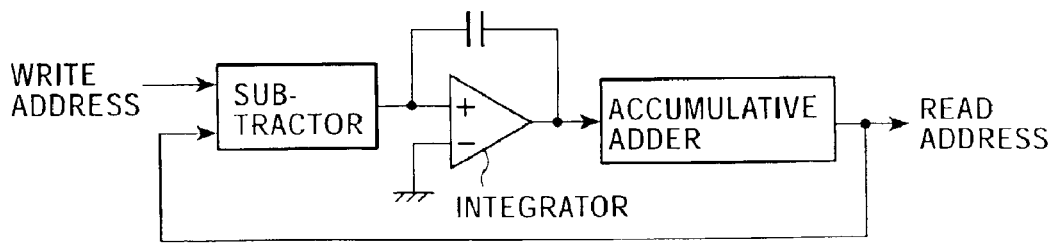
FIG. 15 is a block diagram showing another example of the sampling address forming circuit.

Referring to FIGS. 6 and 7, serial data of an address difference between a write address and a read address in the ring buffer 12 (in FIG. 13) is captured from a sampling frequency conversion circuit (not shown) to a receiving register 41 (step S121), and is converted into parallel data.

Next, a register 42, an adder 43, and a register 44 perform the addition and averaging of the address-difference data in units of periods (e.g., 512 periods of the output clock $C_o \approx 11$-millisecond period) of a short period enable signal, for example, in units of four periods (step S122). In this way, the address-difference data is processed so that minute changes due to the resolution are eliminated, whereby the precision is increased.

The average address-difference data is extracted by using the register 45 and a long period enable signal, and from the extracted data, a comparator 46 extracts the absolute value of the phase difference when an angle of 180 degrees is used as a reference (step S123), and the polarity is detected (step S124).

By using the register 51 and the long period enable signal, data of the average address difference that is one period (e.g., 65536 periods of the output clock $C_o \approx 1.4$-second period) of the ring buffer 12 behind is extracted (step S131). This data and the data from the register 45 are supplied to a subtractor 52, and a change corresponding to the address difference is extracted (steps S132 and S133).

The increasing/decreasing direction of the change is detected by a comparator 53 (step S134). The detection output from the comparator 53 and the output (phase polarity and absolute value) of a comparator 46 are supplied to a determiner 54. The determiner 54 determines in which of a diverging direction and a conversing direction the address difference changes (steps S135 and S136). Data indicating whether correction of the address difference is executed or not executed is extracted and supplied from the determiner 54 to a transmission command generating register 55 (steps S137 and S138). The data supplied to the register 55 is converted into serial data, and the serial data is sent to a sampling frequency converter.

In step S123, if the absolute value of the average address difference is not greater than a predetermined threshold value M (e.g., one word in the ring buffer 12), nothing is performed and this routine ends. Also, in step S133, if it is determined that no address difference occurs in the long period, this routine ends.

By repeatedly performing the above-described processing, the sampling frequency converter can implement stable resampling. If the correcting process is executed by a microcomputer, identical functions and operations can be implemented.

Figure 8:
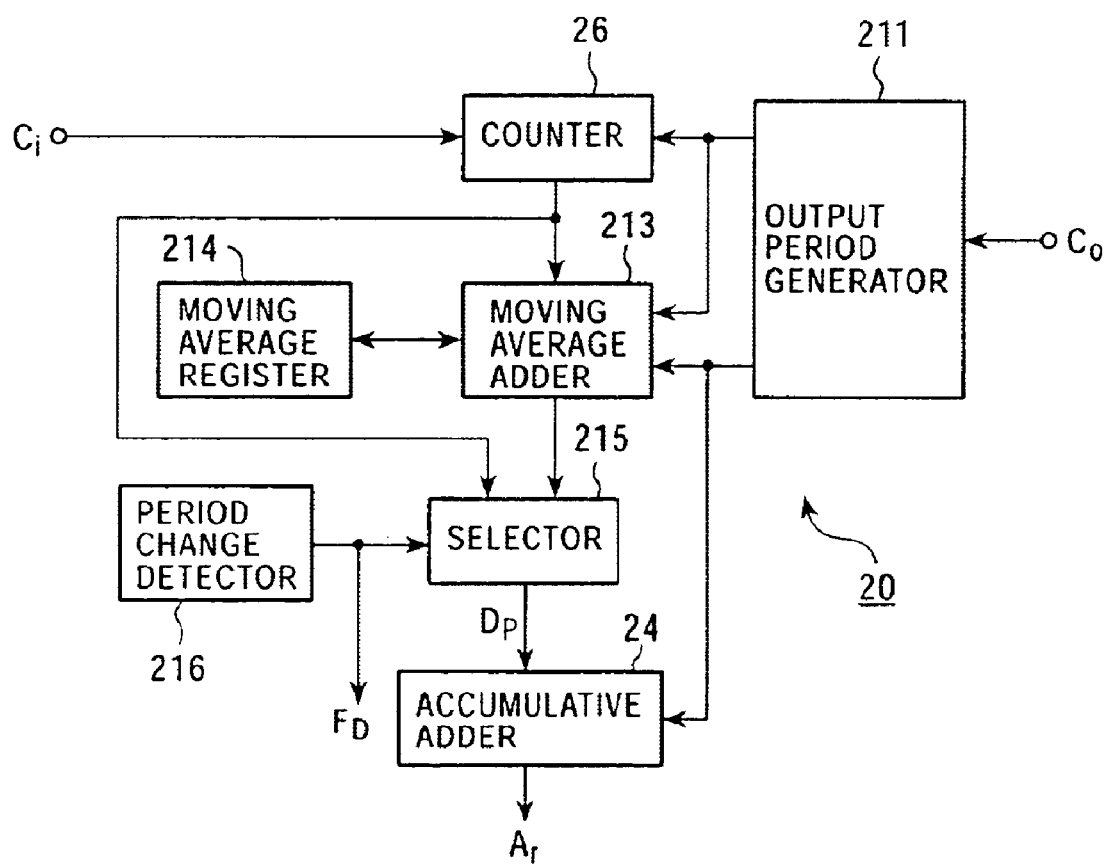
FIG. 8 is a block diagram showing another example of the resampling address generator of the present invention.
Figure 9:
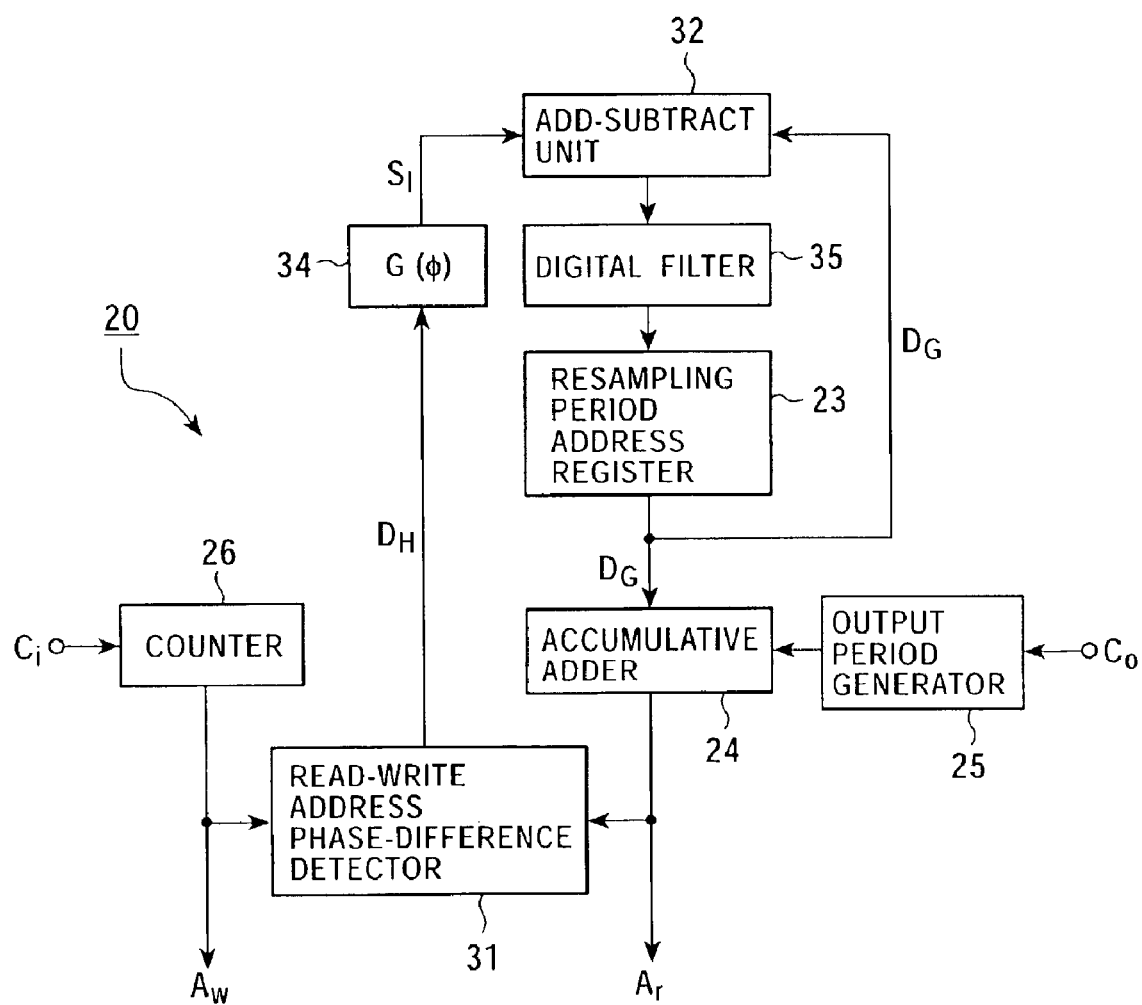
FIG. 9 is a block diagram showing another example of the resampling address generator of the present invention.
Figure 10:
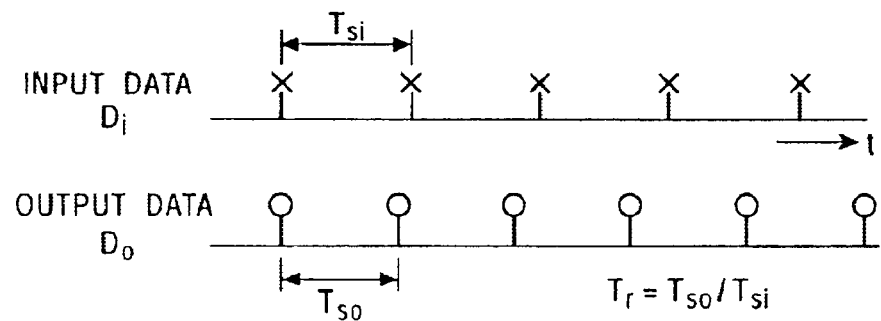
FIG. 10 is an illustration of a sampling frequency.
Figure 11:
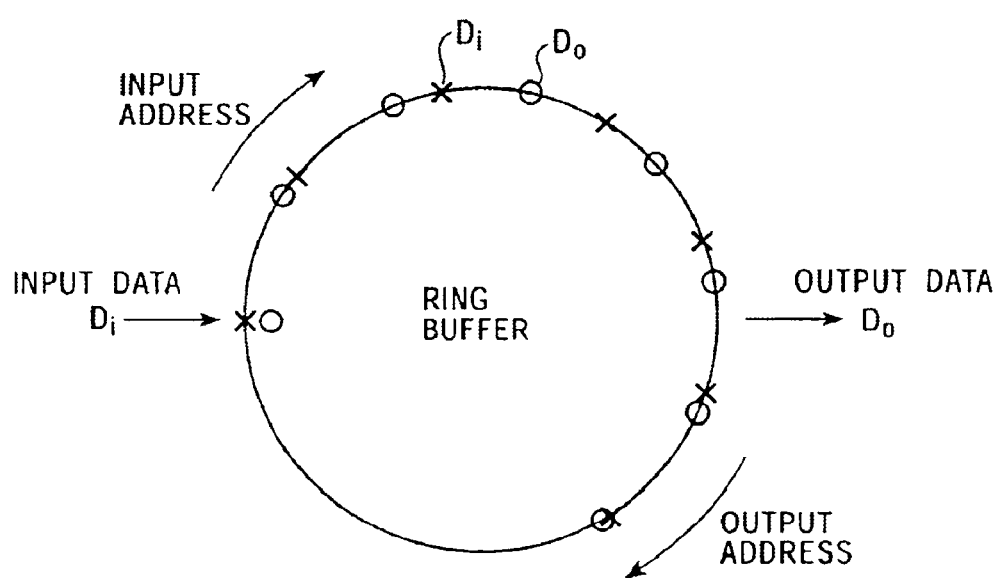
FIG. 11 is an illustration of sampling frequency conversion.
Figure 12:
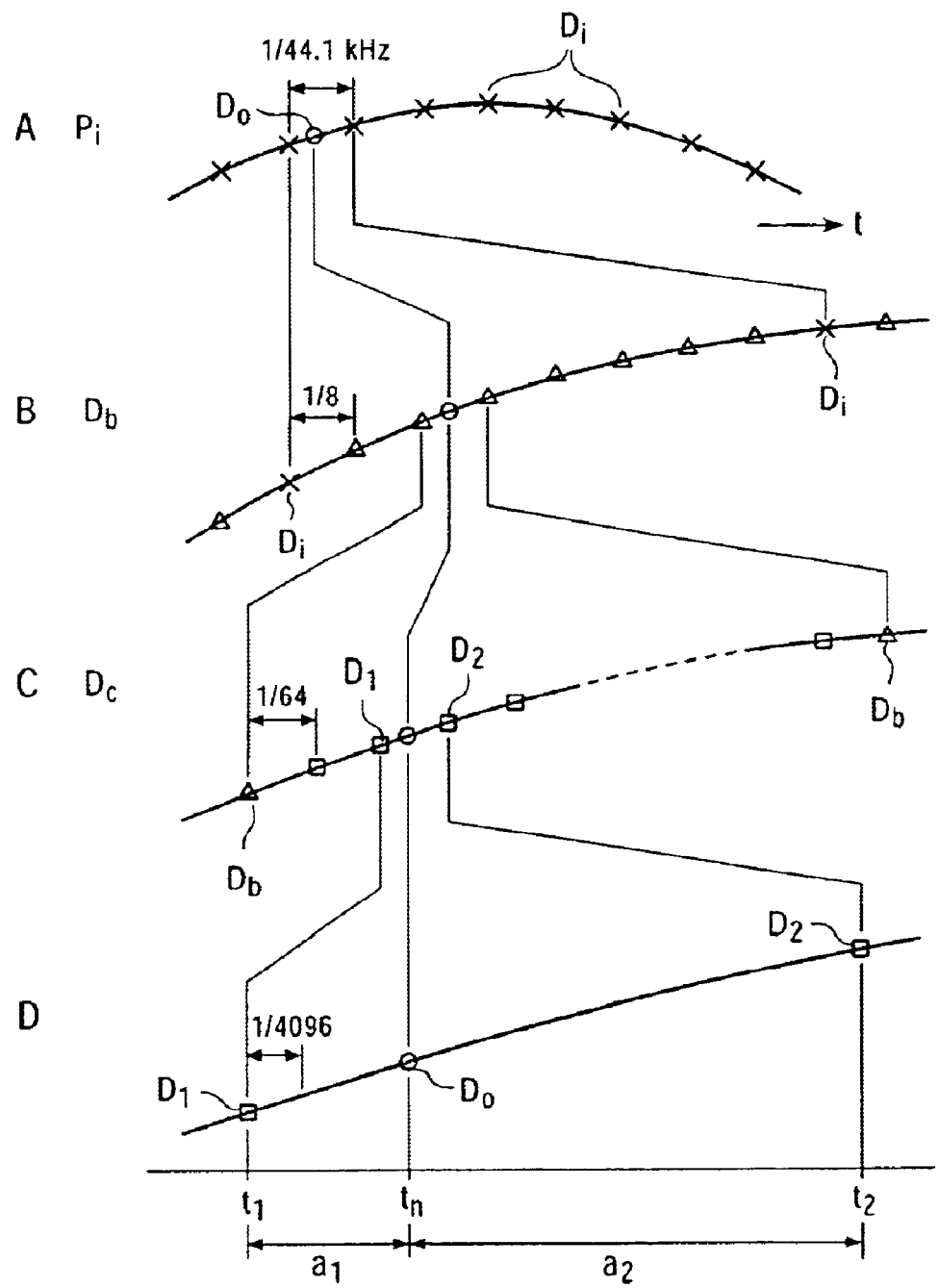
FIG. 12 consists of graphs illustrating sampling frequency conversion.

FIGS. 8 and 9 show other examples of the resampling address generator 20. In the example in FIG. 8, the period (address) data $D_p$ from the resampling period address generator 21 (FIG. 5), which is of a change adaptive type, and the output from the output period generator 211 (FIG. 5) are supplied to an accumulative adder 24, whereby a read address $A_r$ is generated.

In the example in FIG. 9, the resampling address generator 20 is formed in accordance with (feedback) method 2. The period data $D_G$ from the resampling period address register 23 is supplied to an add-subtract unit 32, the phase-difference data $D_H$ from the read-write address phase-difference detector 31 is supplied to a resampling period address forming circuit 34, and the output of the add-subtract unit 32 is supplied to a resampling period address register 34 through a digital low-pass filter 35. The generation of the resampling-point-period-correcting command signal SI by the resampling period address forming circuit 34 is performed by functions and operation similar to those described with reference to FIGS. 6 and 7.

What is claimed is:

1. A resampling address generator for generating a write address and a read address in a buffer memory for a sampling frequency converter, said resampling address generator comprising:

a resampling period address generator for generating period data representing a period of the read address in accordance with a sampling frequency ratio between an input clock and an output clock;

a resampling period address register for retaining the period data generated by said resampling period address generator;

a selector for selectively extracting the period data generated by said resampling period address generator and retained by said resampling period address register;

an accumulative adder for generating the read address by accumulatively adding the extracted period data; and a frequency change detector for determining whether or not periods of the input clock and the output clock are stable;

wherein, when said frequency change detector determines that the periods of the input clock and the output clock are stable, said selector is controlled to extract the period data retained by said resampling period address register.

2. A resampling address generator according to claim 1, further comprising:

a phase-difference detector for detecting, in each predetermined period, a phase difference between the write address and the read address; and correcting means which, when the detected phase difference is outside of an allowable range, corrects the period data retained by said resampling period address register so that the detected phase difference is within the allowable range.

3. A resampling address generator according to claim 2, wherein said correcting means extracts a change in the detected phase difference for a predetermined period, and performs, on the period data retained by said resampling period address register, correction based on the extracted change and the detected phase difference.

4. A resampling address generator for generating a write address and a read address in a buffer memory for a sampling frequency converter, said resampling address generator comprising:

a resampling period address generator for generating period data representing a period of the read address in accordance with a sampling frequency ratio between an input clock and an output clock;

correcting means for generating corrected period data by correcting the period data;

a selector for selectively extracting the period data and the corrected period data;

a resampling period address register for temporally retaining an output from said selector;

an accumulative adder for generating the read address by accumulatively adding outputs from said resampling period address register;

a period detector for determining whether or not periods of the input clock and the output clock are stable; and a phase difference detector for detecting a phase difference between the write address and the read address;

wherein:

when the output of said period detector does not indicate that the periods of the input clock and the output clock are stable, a value of data retained by said resampling period address register is updated by loading the period data through said selector, and the read address is generated by supplying the output of said resampling period address register to said accumulative adder;

when the output of said period detector indicates that the periods of the input clock and the output clock are stable, and a command is internally or externally received, updating of the data retained by said resampling period address register is stopped, and the read address is generated by supplying the output of said resampling period address register to said accumulative adder; and when the updating of the data retained by said resampling period address register is stopped, and the output of said phase difference detector indicates that the phase difference between the write address and the read address is outside a predetermined allowable range, the value of the data retained by said resampling period address register is updated by loading the corrected period data into said resampling period address register through said selector, and the read address is generated by supplying the output of said resampling period address register to said accumulative adder.

5. A resampling address generator according to claim 4, further comprising:

a counter for determining the period of the output clock by using the input clock as each unit;

a circuit for outputting a moving average of outputs from said counter; and a second selector for selectively extracting one output from said counter and the moving average of outputs;

wherein:

when the output of said period detector does not indicate that the periods of the input clock and the output clock are stable, the one output from said counter is output as the period data through said second selector; and when the output of said period detector indicates that the periods of the input clock and the output clock are stable, the moving average of outputs is output as the period data through said second selector.

6. A resampling address generator for generating a write address and a read address in a buffer memory for a sampling frequency converter, said resampling address generator comprising:

an add-subtract unit for correcting period data representing a period of the read address by performing addition or subtraction of correction data;

a resampling period address register for feeding back the corrected period data to said add-subtract unit after temporarily retaining the period data;

an accumulative adder for generating the read address by performing accumulative addition of the retained period data;

a phase difference detector for detecting a phase difference between the write address and the read address; and correcting means for generating the correction data by using an output of said phase difference detector.

7. A resampling address generator according to claim 6, wherein said correcting means extracts a change in the detected phase difference for a predetermined period, and performs, on the period data retained by said resampling period address register, correction based on the extracted change and the detected phase difference.

* * * * *